United States Patent
Echeverri et al.

(10) Patent No.: US 10,900,525 B2
(45) Date of Patent: Jan. 26, 2021

(54) LOAD DISTRIBUTING WASHER

(71) Applicant: Honda Motor Co., Ltd., Tokyo (JP)

(72) Inventors: Jhon J. Echeverri, Columbus, OH (US); Takahiro Nozaki, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 903 days.

(21) Appl. No.: 15/474,896

(22) Filed: Mar. 30, 2017

(65) Prior Publication Data

US 2018/0283462 A1    Oct. 4, 2018

(51) Int. Cl.
*F16D 3/84* (2006.01)
*F16D 3/223* (2011.01)
*F16C 11/06* (2006.01)
*F16B 43/02* (2006.01)

(52) U.S. Cl.
CPC .......... *F16D 3/845* (2013.01); *F16C 11/0671* (2013.01); *F16D 3/223* (2013.01); *F16B 43/02* (2013.01); *F16D 2003/22316* (2013.01); *Y10T 403/32729* (2015.01)

(58) Field of Classification Search
CPC .......... F16D 3/221; F16D 3/223; F16D 3/224; F16D 3/84; F16D 2003/22316; F16C 11/0671; Y10T 403/315; Y10T 403/32729; B60K 17/24
See application file for complete search history.

(56) References Cited

U.S. PATENT DOCUMENTS

| | | | | |
|---|---|---|---|---|
| 2,510,362 A | * | 6/1950 | Anderson | F16D 3/224 464/175 |
| 2,579,356 A | * | 12/1951 | Anderson | F16D 3/223 464/144 |
| 5,318,480 A | * | 6/1994 | Essi | F16J 3/048 277/636 |
| 2001/0007832 A1 | * | 7/2001 | Takabe | C10M 169/00 464/15 |
| 2015/0096825 A1 | | 4/2015 | Goethe | |
| 2016/0319877 A1 | | 11/2016 | Nicholas et al. | |

FOREIGN PATENT DOCUMENTS

| | | |
|---|---|---|
| CN | 202461959 U | 10/2012 |
| CN | 103953657 A | 7/2014 |
| CN | 106090044 A | 11/2016 |

(Continued)

*Primary Examiner* — Michael P Ferguson
(74) *Attorney, Agent, or Firm* — American Honda Motor Co., Inc.; Mark E. Duell

(57) ABSTRACT

A constant velocity joint includes a joint body, a boot adapter and a rubber boot, a plurality of fasteners for attaching the boot adapter to the joint body, the fasteners being receivable in a plurality of holes in the boot adapter and a plurality of holes in the joint body, a propeller shaft extending from the boot adapter, and a load distributing washer located between the boot adapter and the plurality of fasteners. The load distributing washer includes an annular disk having a first side and a second side, the annular disk having a clearance shape through which a boot portion of the boot adapter may be inserted, a flange extending perpendicularly from an outer edge of the second side of the annular face, and a plurality of fastener holes for receiving the plurality of fasteners for fixedly attaching the boot adapter to the joint body.

14 Claims, 5 Drawing Sheets

(56) References Cited

FOREIGN PATENT DOCUMENTS

| | | | | |
|---|---|---|---|---|
| GB | 1 200 170 | * 7/1970 | ............... | F16J 15/52 |
| GB | 2 095 369 | * 9/1982 | ............... | F16D 3/16 |
| JP | 2010095224 A | 4/2010 | | |
| JP | 2014005915 A | 1/2014 | | |
| KR | 101013726 B1 | 2/2011 | | |

* cited by examiner

SECTION B-B

SECTION A-A

LOAD DISTRIBUTING WASHER

TECHNICAL FIELD

The embodiments disclosed herein relate generally to the field of load distributing washers, and more specifically to load distributing washers for use in constant velocity joints.

BACKGROUND

In the past, the method to attach a boot to a constant velocity ("CV") joint was to bolt the boot to the CV joint. A washer, or a washer with two bolt holes, was typically used to distribute the load caused from tightening of the bolts. Without load distribution there is the possibility of flexing the boot material that retains grease within the CV joint, causing grease to leak from the CV joint.

Individual or two-hole washers used for load distribution required additional handling by the installer. Therefore, there is a need for a new load distribution method for attaching the propeller shaft to the CV joint where that handling is avoided and stress is reduced in the joint.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a load distributing washer for use in connecting a first component to a second component with a plurality of fasteners includes an annular disk having a first side and a second side, the annular face having a clearance shape through which a portion of the first component may be inserted, a flange extending perpendicularly from an outer edge of the second side of the annular face, and a plurality of fastener holes for receiving the plurality of fasteners for fixedly attaching the first component to the second component.

According to another aspect, a constant velocity joint includes a joint body, a boot adapter, a plurality of fasteners for attaching the boot adapter to the joint body, the fasteners being receivable in a plurality of holes in the boot adapter and a plurality of holes in the joint body, a propeller shaft extending from the joint body through the boot adapter, and a load distributing washer located between the boot adapter and the plurality of fasteners. The load distributing washer includes an annular disk having a first side and a second side, the annular disk having a clearance shape through which a boot portion of the boot adapter may be inserted, a flange extending perpendicularly from an outer edge of the second side of the annular face, and a plurality of fastener holes for receiving the plurality of fasteners for fixedly attaching the boot adapter to the joint body.

According to yet another aspect, a method of assembling a constant velocity joint is disclosed. The constant velocity joint includes a joint body, a boot adapter, and a load distributing washer. The method includes the steps of installing the boot adapter onto the joint body, aligning a plurality holes in the boot adapter with a plurality of holes in the joint body, press fitting a flange that extends axially from an outer edge of the boot adapter to the joint body, installing the load distributing washer onto the boot adapter, a boot portion of the boot adapter being disposed through a clearance opening in the load distributing washer, aligning a plurality of holes in the load distributing washer with the plurality of holes in the boot adapter, and press fitting a flange that extends axially from an outer edge of the load distributing washer to the flange of the boot adapter.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
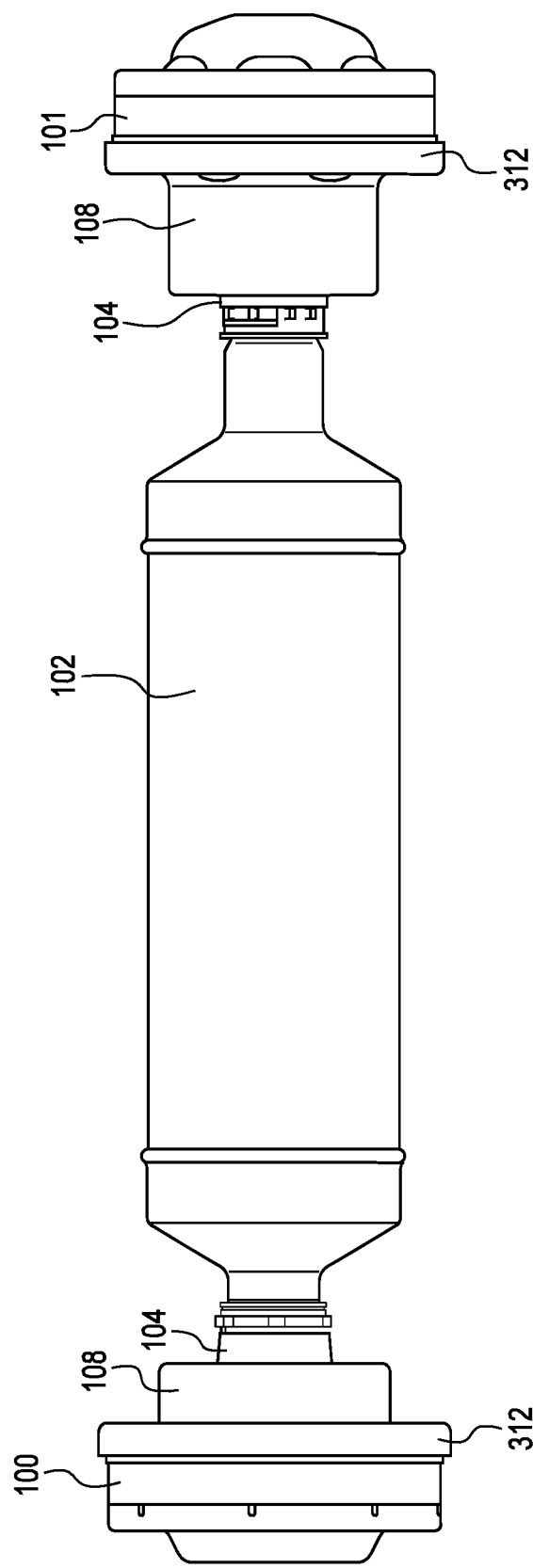
FIG. 1 is side view of a drive shaft with a pair of constant velocity joints.
Figure 2:
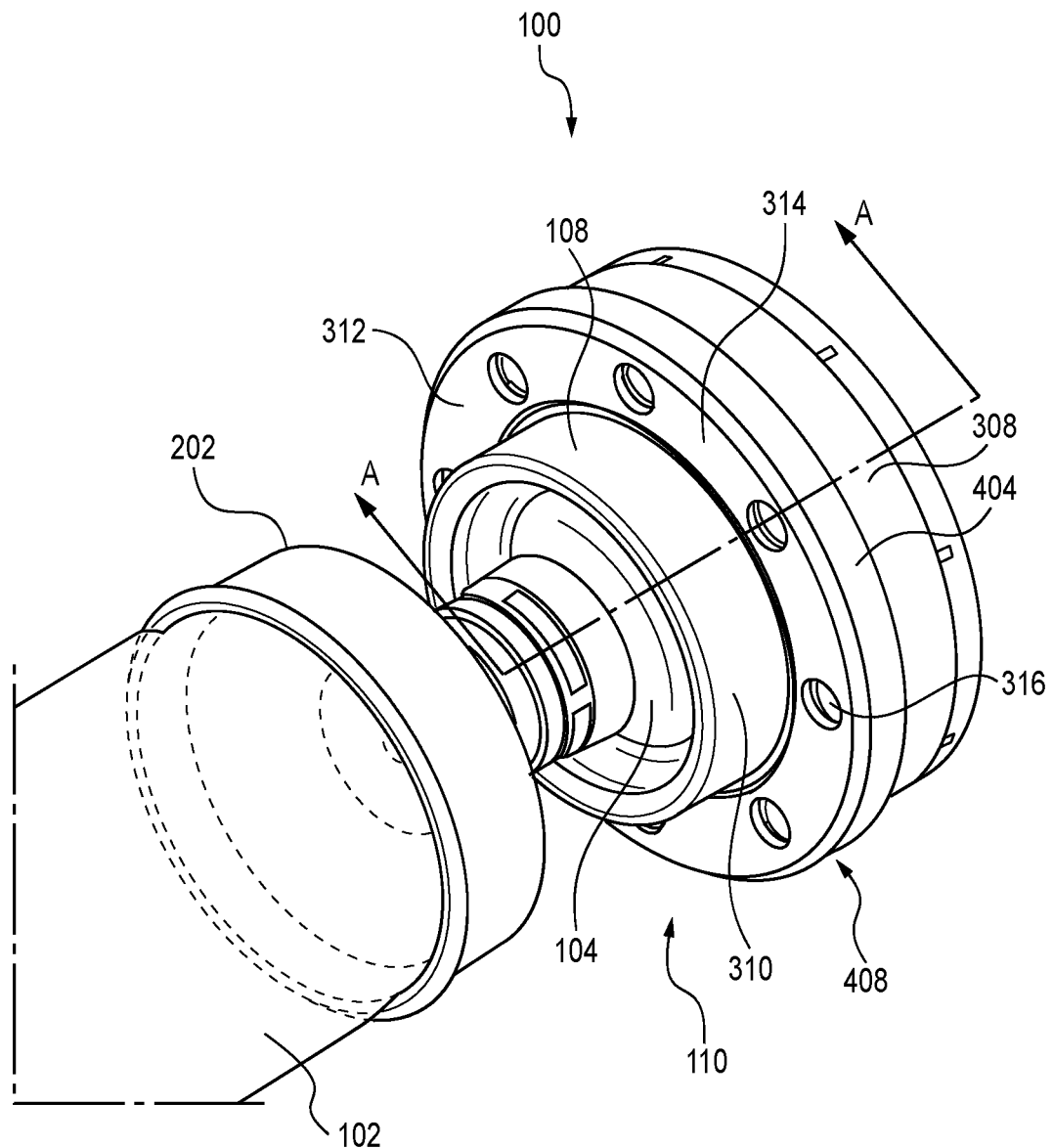
FIG. 2 is a perspective view of a propeller shaft's constant velocity joint including a load distributing washer.
Figure 3:
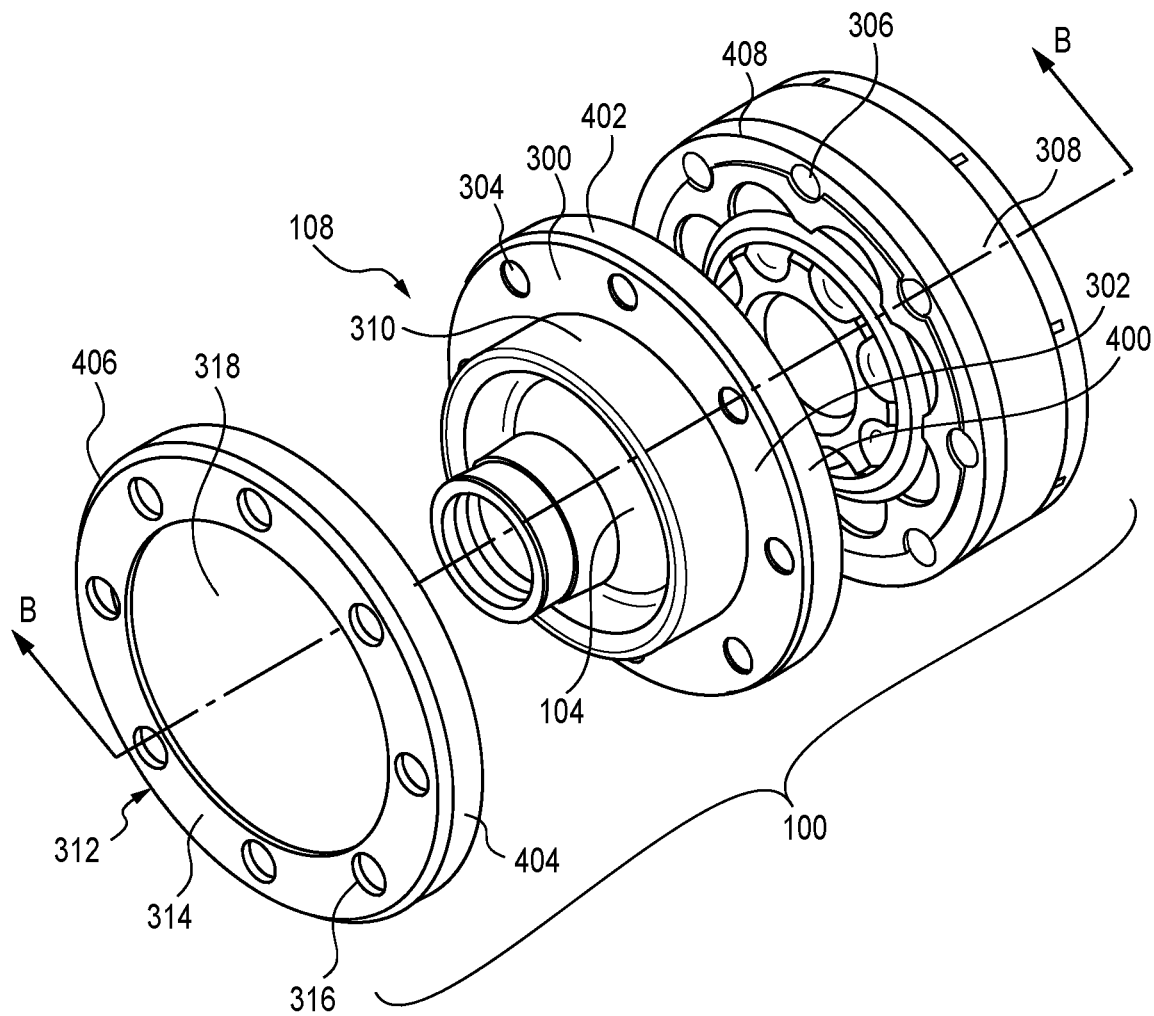
FIG. 3 is a perspective exploded view of the constant velocity joint including the load distributing washer.
Figure 4:
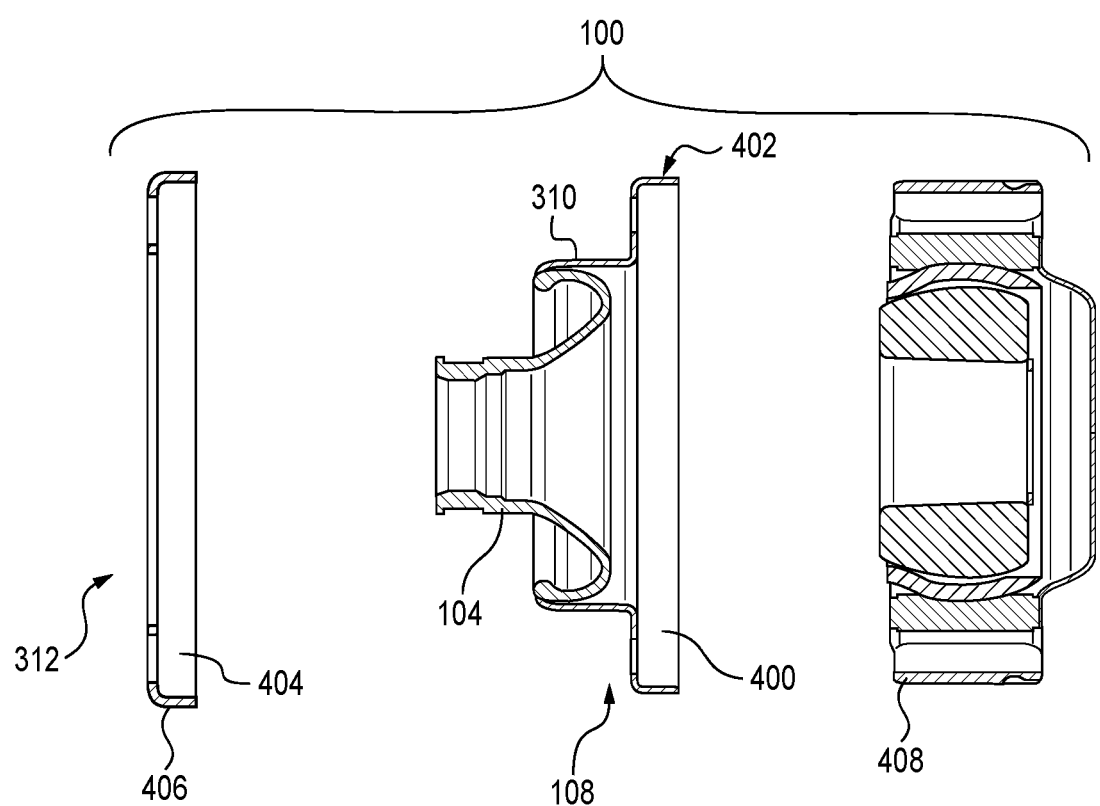
FIG. 4 is a side exploded view of the constant velocity joint including the load distributing washer.
Figure 5:
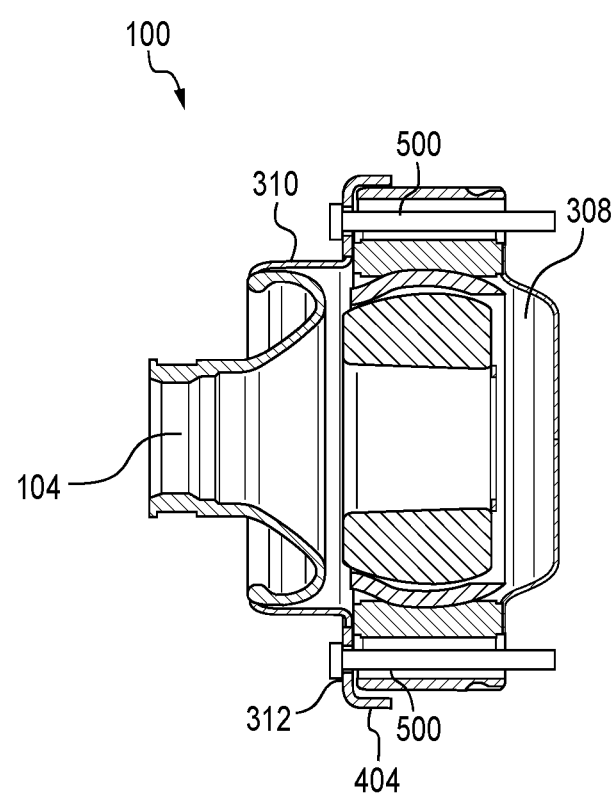
FIG. 5 is a side cross-sectional view of the constant velocity joint including the load distributing washer.

FIG. 1 is a representation of a pair of constant velocity ("CV") joints 100, 101 that are used to allow a drive shaft 102 to transmit power through a variable angle, at constant rotational speed, without an appreciable increase in friction or play. CV joints 100, 101 are mainly used in front wheel drive vehicles, although rear wheel drive cars with independent rear suspensions may use CV joints 100 at the ends of the rear axle half shafts and on the drive shafts 102. The CV joints 100, 101 are of the type described in U.S. Pat. No. 1,916,442 to Rzeppa, which is hereby incorporated by reference.

A CV joint 100, 101 is protected by a rubber boot 104 around the drive shaft 102 and a boot adapter 108 around the rubber boot 104. The CV joint 100, 101 may be filled with molybdenum disulfide grease to ensure smooth operation of the CV joint 100, 101 under all operating conditions. Cracks and splits in the rubber boot 104 or the boot adapter 108 may allow contaminants, such as dust or debris, into the CV joint 100, which could cause the joint to wear quickly. The boot adapter 108 may be made of steel, stainless steel, aluminum, or any other suitable material known to those skilled in the art.

FIGS. 2-5 illustrate the propeller shaft side 110 of the CV joint 100 in greater detail. The same details also apply to the CV joint 101 on the opposite end of the drive shaft 102. An end 202 of the drive shaft 102 is secured through the rubber boot 104 and the boot adapter 108 and inserted into the joint body 308. The boot adapter 108 may include a disk portion 300 at an outer radial portion 302 of the boot adapter 108. The disk portion 300 may include a plurality of holes 304, on the order of between six (6) to twelve (12), spaced for alignment with corresponding holes 306 on a joint body 308 of the CV joint 100 for receipt of fasteners 500 for securing the boot adapter 108 to a corresponding companion flange (not shown) of the CV joint 100. The boot adapter 108 further may include a steel boot portion 310 in an inner radial part of the boot adapter 108, to which the rubber boot 104 is crimped inside. The rubber boot 104 and the boot adapter 108 contain the molybdenum disulfide grease associated with the CV joint 100.

The fasteners 500 may be bolts, which include a head and a threaded body, or any other suitable fasteners known to those skilled in the art.

A load distributing washer 312 may include an annular disk portion 314 with holes 316 arranged for alignment with the holes 304 of the boot adapter 108. A central clearance shape or opening 318 of the load distributing washer 312 is sized for receipt of the load distributing washer 312 onto the boot adapter 108 over the boot portion 310.

The boot adapter 108 includes a flange 400 extending axially from the disc portion 300 from an outer edge 402 around the circumference of the boot adapter 108. The load distributing washer 312 also includes a flange 404 extending axially from the disk portion 314 around the outer edge 406 of the load distributing washer 312. The flange 400 of the boot adapter 108 is configured for press fit onto the CV joint 100 at an end 408 of the CV joint 100. The flange 404 of the load distributing washer 312 is, in turn, configured for press fit onto the flange 400 of the boot adapter 108.

The load distributing washer 312 may be constructed of any suitable material for washers in general known to those skilled in the art, including, but not limited to, steel, stainless steel, metals or metal alloys, rubber, polymers, EPDM, plastic, and the like.

To assemble the CV joint 100, the boot adapter 108 is fitted on the propeller shaft side 110 of the CV joint 100 lubricated with molybdenum disulfide grease. The boot adapter 108 is rotated so that the plurality of holes 304 are aligned with the corresponding holes 306 on the joint body 308 of the CV joint 100 and the flange 400 of the boot adapter 108 is press fitted on the end 408 of the CV joint 100. The load distributing washer 312 is then installed over the top of boot adapter 108, with the boot portion 310 of the boot adapter 108 disposed in the clearance shape or opening 318 of the load distributing washer 312. The load distributing washer 312 is then rotated to align the plurality of holes 316 with the plurality of holes 304 in the boot adapter 108. The flange 404 of the load distributing washer 312 is then press fit over the flange 400 of the boot adapter 108 to help to hold the load distributing washer 312 in place, with all the holes 304, 306, 316 aligned, over top of the boot adapter 108 and on the CV joint 100. An installer is then able to easily install the fasteners 500 to fixedly attach the load distributing washer 312, boot adapter 108, and CV joint 100 together with a companion flange (not shown) on the opposite side of the CV joint 100. The load distributing washer 312 operates to distribute the torque of the fasteners 500 over the entirety of the load distributing washer 312 and the disk portion 302 of the boot adapter 108. By distributing the torque load, there is reduced possibility of flexing of the boot adapter 108 that could lead to leaks of grease from the CV joint 100.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A constant velocity joint for a vehicle, comprising:
   a constant velocity joint body;
   a boot adapter, comprising:
   a disk portion having a plurality of disk fastener holes for receiving a plurality of fasteners;
   a boot portion extending axially from a center of the disk portion for receiving a shaft therethrough; and
   an annular flange portion extending from an outer edge of the disk portion, the flange portion being press fit onto an outer circumference of the constant velocity joint body;
   a load distributing washer, comprising:
   an annular disk having a first side and a second side, the annular disk having a clearance shape through which the boot portion of the boot adapter is inserted;
   an annular flange extending perpendicularly from an outer edge of the second side of the annular disk, the flange being press fit onto an outer circumference of the flange portion of the boot adapter and the outer circumference of the joint body to prevent flexing of the flange portion; and
   a plurality of fastener holes for receiving the plurality of fasteners for fixedly attaching the boot adapter to the constant velocity joint body,
   wherein the flange of the washer retains the holes of the washer in alignment with the plurality of holes in the boot adapter.

2. The constant velocity joint of claim 1 wherein a propeller shaft protrudes axially from the boot portion of the boot adapter.

3. The constant velocity joint of claim 2 wherein the fasteners are bolts, each bolt having a threaded portion and a head.

4. The constant velocity joint of claim 3 wherein the load distributing washer is positioned between boot adapter and the head of each of the bolts.

5. A constant velocity joint, comprising:
   a constant velocity joint body;
   a boot adapter, comprising:
   a disk portion having a plurality of fastener holes;
   a boot portion extending axially from a center of the disk portion; and
   a flange portion extending from an outer edge of the disk portion, the flange portion being press fit onto an outer circumference of the joint body;
   a plurality of fasteners for attaching the boot adapter to the joint body, the fasteners being receivable in the plurality of fastener holes in the boot adapter and a plurality of holes in the joint body;
   a propeller shaft extending from the joint body through the boot portion of the boot adapter; and
   a load distributing washer located between the boot adapter and the plurality of fasteners, comprising:
   an annular disk having a first side and a second side, the annular disk having a clearance shape through which the boot portion of the boot adapter is inserted;
   an annular flange extending perpendicularly from an outer edge of the second side of the annular disk, the flange being press fit onto an outer circumference of the flange portion of the boot adapter and the outer circumference of the joint body to prevent flexing of the flange portion; and a plurality of fastener holes for receiving the plurality of fasteners for fixedly attaching the boot adapter to the joint body, wherein the flange of the washer retains the holes of the washer in alignment with the plurality of holes in the boot adapter.

6. The constant velocity joint of claim 5 wherein the plurality of fasteners are bolts, each bolt having a threaded portion and a head.

7. The constant velocity joint of claim 6 wherein the load distributing washer is positioned between boot adapter and the head of each of the bolts.

8. The constant velocity joint of claim 5 wherein the boot adapter creates a seal to seal a grease inside the joint body.

9. The constant velocity joint of claim 8 wherein the load distributing washer prevents the plurality of fasteners from flexing the boot adapter to break the seal between the boot adapter and the joint body.

10. The constant velocity joint of claim 8 wherein the grease is molybdenum disulfide grease.

11. A method of assembling a constant velocity joint, comprising the steps of:

providing a constant velocity joint body;

providing a boot adapter, comprising:

a disk portion having a plurality of fastener holes for receiving a plurality of fasteners;

a boot portion extending axially from a center of the disk portion for receiving a shaft therethrough; and an annular flange portion extending from an outer edge of the disk portion;

providing a load distributing washer, comprising:

an annular disk having a first side and a second side, the annular disk having a clearance shape through which the boot portion of the boot adapter is inserted;

an annular flange extending perpendicularly from an outer edge of the second side of the annular disk; and a plurality of fastener holes for receiving the plurality of fasteners for fixedly attaching the boot adapter to the joint body;

aligning the plurality of holes in the boot adapter with a plurality of holes in the joint body;

press fitting the flange portion of the boot adapter onto an outer circumference of the joint body;

aligning the plurality of holes in the load distributing washer with the plurality of holes in the boot adapter; and press fitting the flange of the load distributing washer onto an outer circumference of the flange portion of the boot adapter and the outer circumference of the joint body to prevent flexing of the flange portion, wherein the flange of the washer retains the holes of the washer in alignment with the plurality of holes in the boot adapter.

12. The method of claim 11 further comprising the step of:

installing fasteners through the plurality of holes in the load distributing washer and the plurality of holes in the boot adapter into the plurality of holes in the joint body.

13. The method of claim 12 wherein the fasteners are a plurality of bolts received in the plurality of holes in the joint body and through the plurality of holes in the load distributing washer and the plurality of holes in the boot adapter, the method further comprising the steps of:

tightening the plurality of bolts, the load distributing washer distributing the torque load of the bolts to prevent flexing of the boot adapter.

14. The method of claim 11 first comprising the step of: greasing the joint body.

* * * * *